(12) United States Patent
Kawaguchi

(10) Patent No.: US 7,127,544 B2
(45) Date of Patent: Oct. 24, 2006

(54) DATA TRANSFER APPARATUS AND DATA TRANSFER METHOD

(75) Inventor: Kenichi Kawaguchi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 250 days.

(21) Appl. No.: 09/897,574

(22) Filed: Jul. 2, 2001

(65) Prior Publication Data

US 2002/0004873 A1    Jan. 10, 2002

(30) Foreign Application Priority Data

Jul. 4, 2000    (JP)    ............................ 2000-202675

(51) Int. Cl.
*G06F 13/36*    (2006.01)

(52) U.S. Cl. ...................... 710/306; 710/305; 710/100; 710/107

(58) Field of Classification Search ........ 710/305–306, 710/3, 107, 100; 711/156, 113–130
See application file for complete search history.

(56) References Cited

U.S. PATENT DOCUMENTS

| | | | |
|---|---|---|---|
| 5,586,263 A | 12/1996 | Katsumata et al. | |
| 5,659,718 A | 8/1997 | Osman et al. | |
| 5,761,725 A | 6/1998 | Zeller et al. | |
| 6,032,234 A * | 2/2000 | Kishi | 711/156 |
| 6,167,475 A * | 12/2000 | Carr | 710/113 |
| 6,189,078 B1 * | 2/2001 | Bauman et al. | 711/156 |
| 6,195,730 B1 * | 2/2001 | West | 711/121 |
| 6,317,799 B1 * | 11/2001 | Futral et al. | 710/22 |
| 6,321,296 B1 * | 11/2001 | Pescatore | 711/118 |
| 6,341,334 B1 * | 1/2002 | Kamemaru | 711/137 |
| 6,510,475 B1 * | 1/2003 | Bennett | 710/60 |

* cited by examiner

*Primary Examiner*—Rehana Perveen
*Assistant Examiner*—Kim T. Huynh
(74) *Attorney, Agent, or Firm*—Hamre, Schumann, Mueller & Larson, P.C.

(57) ABSTRACT

A data transfer apparatus for transferring data between a system bus and a local bus at a high speed is provided. A bus bridge 101 is connected between a system bus 132 and a local bus 137. Data transferred between a CPU 133, an I/O device 136 and a main memory 135 on the system bus 132 are retained in an associative memory 106 via an associative memory control unit 105. When an access to this data from an I/O device 138 on the local bus 137 is generated, the data are transferred from the associative memory 106 to the I/O device 138. Thus, when a data transfer request from the I/O device 138 to the main memory 135 is generated, no bus cycle is generated on the system bus 132 as long as this data are retained in the associative memory 106. Consequently, the data can be transferred at a high speed.

5 Claims, 8 Drawing Sheets

DATA TRANSFER APPARATUS AND DATA TRANSFER METHOD

BACKGROUND OF THE INVENTION

1. Field of the Invention

The present invention relates to a data transfer apparatus and a data transfer method. It relates in particular to a data transfer apparatus and a data transfer method, for efficient data transfer from a local bus to a storage unit on a system bus and from the system bus to a storage unit on the local bus.

2. Description of Related Art

Conventionally, data have been transferred via a bus bridge between a system bus to which a CPU is connected and a local bus to which an I/O device is connected. When accessing data in a main memory of the system bus from the I/O device, a request is first made to the bus bridge, then the bus bridge acquires a use authority of the system bus, so as to generate a read cycle on the system bus to the main memory. After the data are obtained, the data are transferred to the local bus.

Next, a conventional data transfer apparatus will be described in detail, with reference to accompanying drawings.

FIG. 7 illustrates a schematic configuration showing a concept of the conventional data transfer apparatus. In FIG. 7, numeral 1 denotes a CPU, numeral 2 denotes a bus arbitration unit, numeral 3 denotes a main memory, numeral 4 denotes an I/O device, numeral 5 denotes a bus bridge, numeral 6 denotes a bridge control unit, numeral 7 denotes a bus arbitration unit, and numeral 8 denotes an address/data control unit. The CPU 1, the bus arbitration unit 2 and the main memory 3 are provided on a system bus, while the I/O device 4 is provided on a local bus.

FIG. 8 shows a timing chart in the case where the I/O device 4 on the local bus causes data to be transferred from the main memory 3 via the bus bridge in the conventional data transfer apparatus described above. As one example, the case of transferring data from address "4000" in the main memory 3 is shown in this figure.

In FIG. 8, numerals 51 to 56 indicate the status of the system bus. Numeral 51 indicates the status of a use authority of the system bus, numeral 52 indicates that of a request signal line from the bus bridge 5 to the bus arbitration unit 2, numeral 53 indicates that of an acknowledge signal line from the bus arbitration unit 2 to the bus bridge 5, numeral 54 indicates that of an address line on the system bus, numeral 55 indicates that of a data line on the system bus, and numeral 56 indicates that of a read/write line on the system bus. Numerals 57 to 61 indicate the status of the local bus. Numeral 57 indicates the status of a request signal line from the I/O device 4 to the bus arbitration unit 7, numeral 58 indicates that of an acknowledge signal line from the bus arbitration unit 7 to the I/O device 4, numeral 59 indicates that of an address line on the local bus, numeral 60 indicates that of a data line on the local bus, and numeral 61 indicates that of a read/write line on the local bus.

The timing chart of FIG. 8 describes the processing by assuming the following operation. Before a data transfer request is generated from the I/O device 4, on the system bus, the CPU 1 writes data to addresses "4000", "4004" and "4008" in the main memory 3 as indicated by numerals 71 to 78.

The following is a description of an operation in the case where a request to read data at the address "4000" in the main memory 3 is generated from the I/O device 4 during the above write operation to the main memory 3 on the system bus.

First, as indicated by numeral 79, the request signal line is asserted so as to request a bus use authority from the bus arbitration unit 7. Next, as indicated by numeral 80, the acknowledge signal line is asserted by the bus arbitration unit 7. Then, as indicated by numeral 81, the bus arbitration unit 7 asserts the request signal line so as to request the use authority of the system bus from the bus arbitration unit 2. Also, as indicated by numeral 82, the address "4000" is driven on the local bus by the I/O device 4.

The bus arbitration unit 2 adjusts a timing of assigning the use authority of the system bus. The bus arbitration unit 2 does not assert the acknowledge signal line to the bus arbitration unit 7 until the data transfer executed on the system bus ends. After the CPU 1 finishes the data transfer, the bus arbitration unit 2 asserts the acknowledge signal line as indicated by numeral 83, so as to permit the bus bridge 5 to use the bus. Subsequently, as indicated by numeral 84, the address "4000" is driven on the system bus from the address/data control unit 8, so that the data is transmitted from the main memory 3 as indicated by numeral 85. Then, as indicated by numeral 86, this data is driven on the local bus to be received by the I/O device 4, thus completing the data transfer.

However, the conventional data transfer apparatus described above has the following problem. When the system bus is in use, the bus arbitration units 2 and 7 cooperate to carry out the bus arbitration. Thus, a time delay is generated in the process where the bus bridge 5 acquires the use authority of the system bus so as to access the main memory 3 on the system bus, thus transferring the data from the main memory 3 to the bus bridge 5. As a result, the data transfer becomes slow.

SUMMARY OF THE INVENTION

It is an object of the present invention to solve the above-described problem and to provide a data transfer apparatus and a data transfer method, for efficient data transfer from a local bus to a storage unit on a system bus and from the system bus to a storage unit on the local bus, not by acquiring a bus use authority with the help of a conventional bus arbitration.

In order to achieve the object mentioned above, a first data transfer apparatus of the present invention includes an associative memory connected between a system bus and a local bus, and a controller for controlling data input/output of the associative memory. The controller fetches an address and data that are transferred between devices on the system bus so as to duplicate and store them in the associative memory, accepts a data transfer request from the local bus and, when an address from which the data is transferred indicated by the data transfer request is contained in the address stored in the associative memory, reads out a corresponding data from the associative memory so as to transfer it to the local bus.

With the above configuration, since the address and the data that are transferred between the devices on the system bus are fetched so as to be duplicated and stored in the associative memory, when an address designated by the data transfer request from the local bus corresponds to the data stored in the associative memory, the data in the associative memory instead of that in the storage unit on the system bus can be transferred to the local bus. In other words, it is not necessary to access the system bus directly, so that the delay in the data transfer owing to the bus arbitration is not generated, achieving a more effective data transfer.

In the data transfer apparatus of the present invention, it is preferable that, when detecting a write cycle of writing a data from one device to another device on the system bus, the controller fetches the address and the data that are transferred between the devices so as to duplicate and store them in the associative memory.

With the above configuration, the data to be fetched can be specified and then fetched in the associative memory of the data transfer apparatus of the present invention according to the timing that the write cycle of writing the data from one device into another device is generated on the system bus.

Also, in the data transfer apparatus of the present invention, it is preferable that the controller monitors a data output enable signal line of at least one device controller on the system bus and, when the data output enable signal line is asserted, fetches the address and the data that are transferred on the system bus so as to duplicate and store them in the associative memory.

With the above configuration, the data to be fetched can be specified and then fetched in the associative memory of the data transfer apparatus of the present invention according to the timing when the data output enable signal line of at least one device controller on the system bus is asserted.

Furthermore, in the data transfer apparatus of the present invention, it is preferable that the controller monitors a data output strobe signal line of at least one device controller on the system bus and, when the data output strobe signal line is asserted, fetches the address and the data that are transferred on the system bus so as to duplicate and store them in the associative memory.

With the above configuration, the data to be fetched can be specified and then fetched in the associative memory of the data transfer apparatus of the present invention according to the timing when the data output strobe signal line of at least one device controller on the system bus is asserted.

Moreover, in the data transfer apparatus of the present invention, it is preferable that, when the address from which the data are transferred indicated by the data transfer request accepted from the local bus is not contained in the address stored in the associative memory, the controller stores a data effective information indicating the address in which a transfer operation has not been completed in response to the data transfer request in a second associative memory, fetches the address and the data that are transferred between the devices on the system bus and, if the fetched address is the address indicated by the data effective information, transfers it to the local bus as data corresponding to the data transfer request.

With the above configuration, even when the data of the address from which the data is transferred corresponding to the data transfer request accepted from the local bus is not contained in the associative memory of the data transfer apparatus of the present invention, it is possible to retain the data effective information indicating a fetching queue in the second associative memory without interrupting the system bus. Accordingly, when the data transfer from the associative memory becomes possible while waiting for the acquisition of the bus use authority, the data can be transferred, achieving a more effective data transfer.

Next, a second data transfer apparatus of the present invention includes an associative memory connected between a system bus and a local bus, and a controller for controlling data input/output of the associative memory. The controller fetches an address and data that are transferred between devices on the local bus so as to duplicate and store them in the associative memory, accepts a data transfer request from the system bus and, when an address from which the data is transferred indicated by the data transfer request is contained in the address stored in the associative memory, reads out a corresponding data from the associative memory so as to transfer it to the system bus.

With the above configuration, since the address and the data that are transferred between the devices on the local bus are fetched so as to be duplicated and stored in the associative memory, when an address designated by the data transfer request from the system bus corresponds to the data stored in the associative memory, the data in the associative memory instead of that in the storage unit on the local bus can be transferred to the system bus. In other words, it is not necessary to access the local bus directly, so that the delay in the data transfer owing to the bus arbitration is not generated, achieving a more effective data transfer.

In the data transfer apparatus of the present invention, it is preferable that, when detecting a write cycle of writing a data from one device to another device on the local bus, the controller fetches the address and the data that are transferred between the devices so as to duplicate and store them in the associative memory.

With the above configuration, the data to be fetched can be specified and then fetched in the associative memory of the data transfer apparatus of the present invention according to the timing that the write cycle of writing the data from one device into another device is generated on the local bus.

Also, in the data transfer apparatus of the present invention, it is preferable that the controller monitors a data output enable signal line of at least one device controller on the local bus and, when the data output enable signal line is asserted, fetches the address and the data that are transferred on the local bus so as to duplicate and store them in the associative memory.

With the above configuration, the data to be fetched can be specified and then fetched in the associative memory of the data transfer apparatus of the present invention according to the timing when the data output enable signal line of at least one device controller on the local bus is asserted.

Furthermore, in the data transfer apparatus of the present invention, it is preferable that the controller monitors a data output strobe signal line of at least one device controller on the local bus and, when the data output strobe signal line is asserted, fetches the address and the data that are transferred on the local bus so as to duplicate and store them in the associative memory.

With the above configuration, the data to be fetched can be specified and then fetched in the associative memory of the data transfer apparatus of the present invention according to the timing when the data output strobe signal line of at least one device controller on the local bus is asserted.

Moreover, in the data transfer apparatus of the present invention, it is preferable that, when the address from which the data is transferred indicated by the data transfer request accepted from the system bus is not contained in the address stored in the associative memory, the controller stores a data effective information indicating the address in which a transfer operation has not been completed in response to the data transfer request in a second associative memory, fetches the address and the data that are transferred between the devices on the local bus and, if the fetched address is the address indicated by the data effective information, transfers it to the system bus as a data corresponding to the data transfer request.

With the above configuration, even when the data of the address from which the data is transferred corresponding to the data transfer request accepted from the system bus is not contained in the associative memory of the data transfer apparatus of the present invention, it is possible to retain the data effective information indicating a fetching queue in the second associative memory without interrupting the local bus. Accordingly, when the data transfer from the associative memory becomes possible while waiting for the acquisition of the bus use authority, the data can be transferred, achieving a more effective data transfer.

Next, a third data transfer apparatus of the present invention includes an associative memory connected between a system bus and a local bus, and a controller for controlling data input/output of the associative memory. The controller fetches an address and data that are transferred between devices on the system bus so as to duplicate and store them in the associative memory, fetches an address and a data that are transferred between devices on the local bus so as to duplicate and store them in the associative memory, accepts a data transfer request from the local bus and, when an address from which the data is transferred indicated by the data transfer request is contained in the address stored in the associative memory, reads out a corresponding data from the associative memory so as to transfer it to the local bus, accepts a data transfer request from the system bus and, when an address from which the data is transferred indicated by the data transfer request is contained in the address stored in the associative memory, reads out a corresponding data from the associative memory so as to transfer it to the system bus.

With the above configuration, since the address and the data that are transferred between the devices on the system bus and the local bus are fetched so as to be duplicated and stored in the associative memory, when an address designated by the data transfer request from the system bus or an address designated by the data transfer request from the local bus corresponds to the data stored in the associative memory, the data in the associative memory instead of that in the storage unit on the system bus or the local bus can be transferred to the system bus. In other words, it is not necessary to access the system bus or the local bus directly, so that the delay in the data transfer owing to the bus arbitration is not generated, achieving a more effective data transfer.

DESCRIPTION OF THE PREFERRED EMBODIMENTS

The following is a description of embodiments of the present invention, with reference to the accompanying drawings.

First Embodiment

Figure 1:
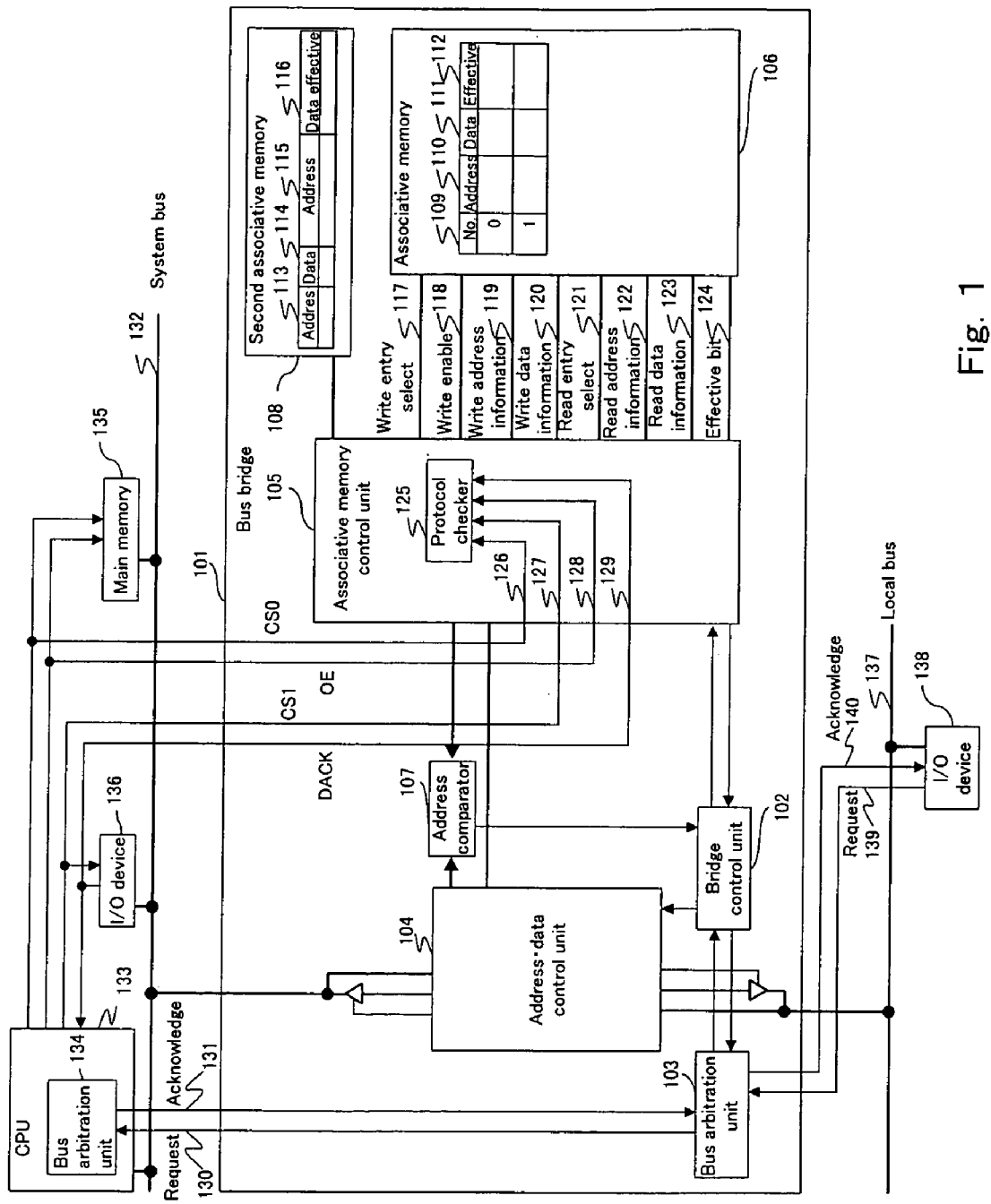
FIG. 1 is a schematic view of a data transfer apparatus of a first embodiment of the present invention.

FIG. 1 shows a schematic configuration of a data transfer apparatus according to the first embodiment of the present invention.

First, each element in FIG. 1 will be described. In FIG. 1, numeral 101 denotes a bus bridge, numeral 102 denotes a bridge control unit, numeral 103 denotes a bus arbitration unit, and numeral 104 denotes an address/data control unit. Numeral 105 denotes an associative memory control unit, numeral 106 denotes an associative memory, and numeral 107 denotes an address comparator unit. Numeral 108 denotes a second associative memory. This is an example of the first embodiment including the second associative memory 108. The second associative memory 108 cooperates with the associative memory 106. When an address from which data should be transferred indicated by a data transfer request accepted from a local bus is not contained in addresses stored in the associative memory 106, this second associative memory 108 stores data effective information indicating the address in which a transfer processing has not been completed in response to the data transfer request. The second associative memory 108 temporarily retains the data transfer request that has not yet processed. Thereafter, by checking whether or not an address that is transferred between devices on a system bus and an address that is fetched in a data buffering processing are the address indicated by the data effective information, it is possible to check whether or not the data corresponding to the unprocessed data transfer request is fetched. When they match the address indicated by the data effective information, the received data can be transferred to the local bus as the data corresponding to the data transfer request.

Numerals 109 to 112 denote elements of each entry of the associative memory 106. Numeral 109 denotes an entry number, numeral 110 denotes address information, numeral 111 denotes data information, and numeral 112 denotes an effective bit. Also, numerals 113 to 116 denote elements of the second associative memory 108. Numeral 113 denotes address information, numeral 114 denotes data information, numeral 115 denotes an address effective bit and numeral 116 denotes a data effective bit.

Next, numerals 117 to 124 denote signal lines between the associative memory 106 and the associative memory control unit 105. Numeral 117 denotes a write entry select signal line, numeral 118 denotes a write enable signal line, numeral 119 denotes a write address information signal line, numeral 120 denotes a write data information signal line, numeral 121 denotes a read entry select signal line, numeral 122 denotes a read address information signal line, numeral 123 denotes a read data information signal line, and numeral 124 denotes an effective bit signal line.

Numeral 125 denotes a protocol checker, numerals 126 and 127 denote chip select signal lines, numeral 128 denotes an output enable signal line, and numeral 129 denotes a data acknowledge signal line, which is between a CPU 133 and the protocol checker 125. Numeral 130 denotes a request signal line, numeral 131 denotes an acknowledge signal line, numeral 132 denotes a system bus, numeral 133 denotes a CPU, numeral 134 denotes a bus arbitration unit, numeral 135 denotes a main memory, numeral 136 denotes an I/O device, numeral 137 denotes a local bus, numeral 138 denotes an I/O device, numeral 139 denotes a request signal line, and numeral 140 denotes an acknowledge signal line.

The bus bridge 101, the CPU 133, the main memory 135 and the I/O device 136 are connected on the system bus 132, while the bus bridge 101 and the I/O device 138 are connected on the local bus 137.

The entire operation of the bus bridge 101 is as follows. When a cycle of accessing a device on the local bus 137 from the CPU 133 is generated on the system bus 132, this cycle is converted to a cycle on the local bus 137. When a cycle of accessing the main memory 135 on the system bus 132 from the I/O device 138 is generated, a request for a use authority of the system bus 132 is made from the bus arbitration unit 103 through the request signal line 130 to the bus arbitration unit 134. After receiving an acknowledge through the acknowledge signal line 131, this cycle is converted to a cycle on the system bus 132.

The bridge control unit 102, the bus arbitration unit 103, the address/data control unit 104, the associative memory control unit 105, the associative memory 106, the address comparator unit 107 and the second associative memory 108 are elements present inside the bus bridge 101.

The bridge control unit 102 controls the entire operation of the bus bridge 101.

The bus arbitration unit 103 arbitrates the use authority of the local bus between the bus bridge 101 and the I/O device 138.

The address/data control unit 104 has a function of converting the cycle on the system bus 132 to the cycle on the local bus 137 and vice versa. It also is connected to the associative memory control unit 105, the address comparator unit 107 and the second associative memory 108, and controls input/output of address and data with respect to the associative memory control unit 105.

The associative memory control unit 105 controls data input/output with respect to the associative memory 106. The associative memory control unit 105 is connected to the associative memory 106 via the write entry select signal line 117, the write enable signal line 118, the write address information signal line 119, the write data information signal line 120, the read entry select signal line 121, the read address information signal line 122, the read data information signal line 123 and the effective bit signal line 124. The associative memory control unit 105 also is connected to the second associative memory 108, and controls the data input/output. In addition, the associative memory control unit 105 includes the protocol checker 125 connected to the chip select signal lines 126 and 127, the output enable signal line 128 and the data acknowledge signal line 129, and detects a bus cycle. When the cycle on the system bus 132 is a read cycle, the associative memory control unit 105 judges that it is a timing to transfer data from these signal lines to the associative memory 106 or the second associative memory 108.

The chip select signal line 126 is a chip select signal line from the CPU 133 to the main memory 135, while the chip select signal line 127 is a chip select signal line from the CPU 133 to the I/O device 136.

The associative memory 106 includes two entries, each having the entry number 109, the address information 110, the data information 111 and the effective bit 112. When the write enable signal line 118 is ON, the address information 110 and the data information 111 of the entry with the entry number designated by the write entry select signal line 117 are overwritten with values of the write address information signal line 119 and the write data information signal line 120 respectively, and, at the same time, the effective bit 112 is turned ON. Also, the address information 110 and the data information 111 of the entry with the entry number designated by the read entry select signal line 121 are driven on the read address information signal line 122 and the read data information signal line 123 respectively.

The bus arbitration units 103 and 134 are connected via the request signal line 130 and the acknowledge signal line 131. Also, the bus arbitration unit 103 is connected to the I/O device 138 via the request signal line 139 and the acknowledge signal line 140.

The address comparator unit 107 is connected to the address/data control unit 104 and the associative memory control unit 105. When address values received from the both units match, the address comparator unit 107 notifies the bridge control unit 102 of the match.

The second associative memory 108 is connected to the associative memory control unit 105. When data corresponding to a data transfer request from the local bus is not contained in the associative memory 106, the associative memory control unit 105 writes the address of this data transfer request into the second associative memory 108. Such address is retained in the address information 113, and the address effective bit 115 is turned ON. When the data is written into the second associative memory, the data is retained in the data information 114 and then the data effective bit 116 is turned ON. The ON status of the address effective bit 115 and the data effective bit 116 shows that an unprocessed data transfer request is present. When a buffering processing has proceeded and the data corresponding to this data transfer request is fetched, the corresponding address and data are read out from the second associative memory 108. Then, the values of the address information 113 and the data information 114 are transferred to the associative memory control unit 105, and, at the same time, the address effective bit 115 and the data effective bit 116 are turned OFF.

When the bus arbitration unit 134 in the CPU 133 is assigning the use authority of the system bus 132 to the CPU 133, the CPU 133 accesses either the main memory 135, the I/O device 136 or the I/O device 138 so as to input/output data, and uses such data for data processing.

In this example, the address space from addresses "0" to "6FFF" is allocated to the main memory 135.

Also, the address space from addresses "7000" to "7FFF" is allocated to the I/O device 136.

The bus arbitration unit 134 arbitrates the use authority of the system bus 132 between the CPU 133 and the bus bridge 101.

Next, the following is a description of the operation of the data transfer apparatus of the first embodiment, with reference to the accompanying drawings.

Figure 2:
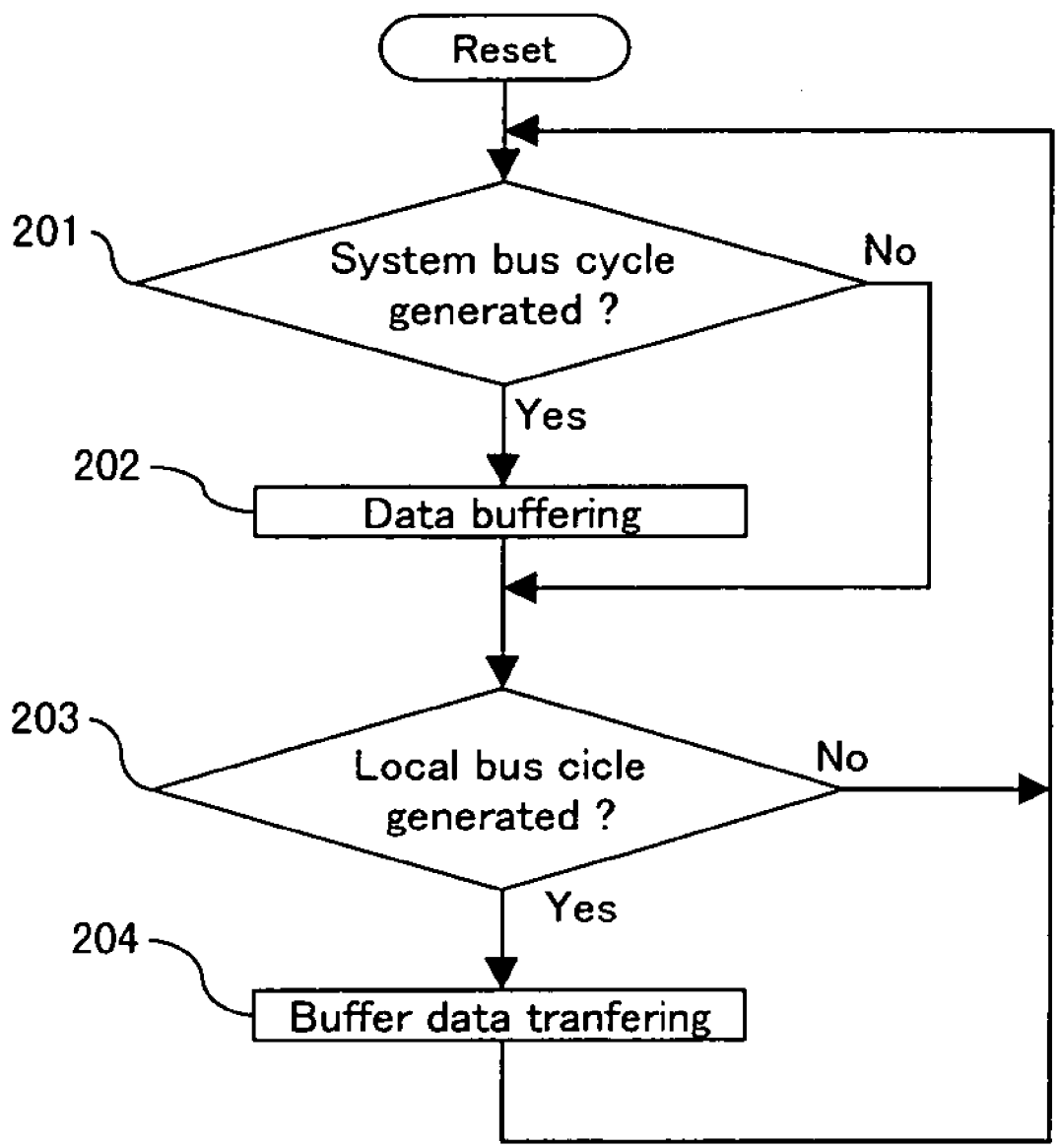
FIG. 2 is a flowchart showing an operation of the data transfer apparatus of the first embodiment.

FIG. 2 is a flowchart showing the operation in the first embodiment. In FIG. 2, numeral 201 indicates a system bus cycle generation detecting processing, numeral 202 indicates a data buffering processing, numeral 203 indicates a local bus request generation detecting processing, and numeral 204 indicates a buffered data transfer processing.

The system bus cycle generation detecting processing 201 is for detecting whether or not a cycle is generated on the system bus 132, in the address/data control unit 104. If the cycle is generated, the process goes on to the data buffering processing 202, while if not, the process goes on to the local bus request generation detecting processing 203. In other words, when the bus cycle is generated on the system bus 132, the process goes on to the data buffering processing 202 for fetching the data being transferred on the system bus 132 into the associative memory 106, while when the bus cycle is not generated on the system bus 132, the process goes on to the processing for judging whether or not the bus arbitration is being executed for the data transfer processing at the request from the local bus.

The data buffering processing 202 is for buffering the data being transferred at a cycle on the system bus 132 in the associative memory 106 or the second associative memory 108, and followed by the local bus request generation detecting processing 203.

The local bus request generation detecting processing 203 is for detecting whether or not the request signal line 139 is asserted, in the bus arbitration unit 103. If the request is generated, the process goes on to the buffered data transfer processing 204, while if not, it returns to the system bus cycle generation detecting processing 201 to continue the process.

The buffered data transfer processing 204 is for transferring the data buffered in the associative memory 106 or the second associative memory 108 in response to the data transfer request from the local bus 137, and after completion of this processing 204, the process returns to the system bus cycle generation detecting processing 201 to continue the process.

Figure 3:
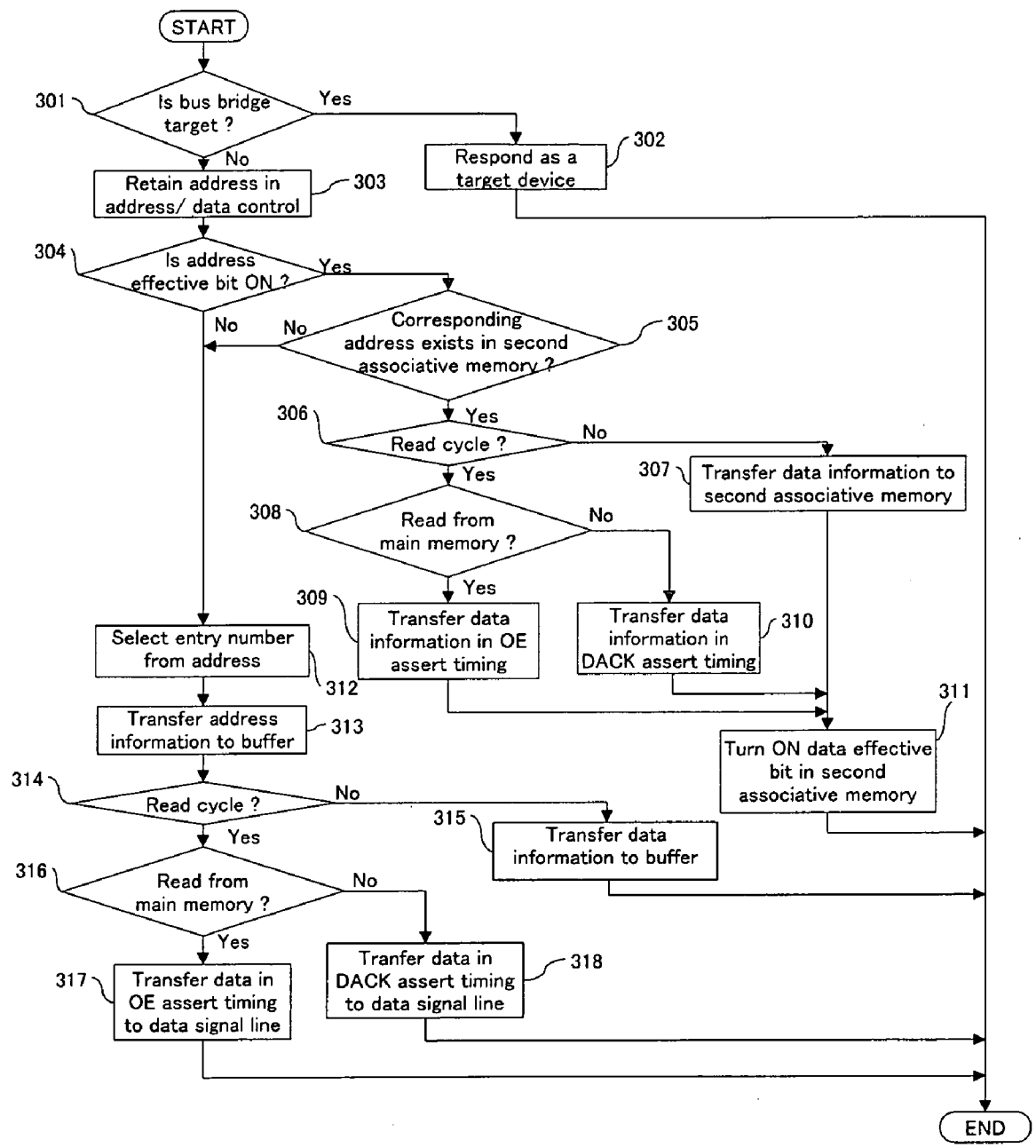
FIG. 3 is a flowchart showing a specific operation of a data buffering processing.

In the following, the data buffering processing 202 above will be described more specifically. FIG. 3 is a flowchart showing a specific operation of the data buffering processing 202. In FIG. 3, numeral 301 indicates a bus bridge target judging processing, numeral 302 indicates a system bus target processing, numeral 303 indicates an address retaining processing, numeral 304 indicates an address effective bit judging processing, numeral 305 indicates a second associative memory address information judging processing, numeral 306 indicates a cycle judging processing, numeral 307 indicates a second associative memory data information transfer processing, numeral 308 indicates a target judging processing, numeral 309 indicates a second associative memory OE synchronous data information transfer processing, numeral 310 indicates a second associative memory DACK synchronous data information transfer processing, numeral 311 indicates a second associative memory data information turning-effective processing, numeral 312 indicates an entry number selecting processing, numeral 313 indicates an address information transfer processing, numeral 314 indicates a cycle judging processing, numeral 315 indicates a data information transfer processing, numeral 316 indicates a target judging processing, numeral 317 indicates an OE synchronous data information transfer processing, and numeral 318 indicates a DACK synchronous data information transfer processing.

The bus bridge target judging processing 301 is for judging whether or not the bus bridge 101 is a target for the current cycle on the system bus 132, in the address/data control unit 104. If it is a target, the process goes on to the system bus target processing 302, while if not, the process goes on to the address retaining processing 303. In other words, the case where the bus bridge 101 is a target for the current cycle on the system bus 132 refers to that where a request to access a resource on the local bus is made from the system bus. In this case, the process goes on to the system bus target processing 302, and the data buffering processing 202 is to end for the present.

The system bus target processing 302 is a processing for responding that the bus bridge 101 is a target for the current cycle on the system bus 132, in the address/data control unit 104, and subsequently the data buffering processing 202 ends.

The address retaining processing 303 is for retaining the value of the address signal line driven from the system bus in the address/data control unit 104, followed by the address effective bit judging processing 304.

The address effective bit judging processing 304 is for judging whether the address effective bit 115 indicating the presence of an unprocessed data transfer request is ON or OFF, in the associative memory control unit 105. If it is ON, for the purpose of checking whether the data to be fetched in the buffering processing at this time correspond to this unprocessed data transfer request, the process goes on to the second associative memory address information judging processing 305. If it is OFF, no unprocessed data transfer request is present at the moment. Thus, for the purpose of storing the data to be fetched in the buffering processing at this time into the associative memory 106, the process goes on to the entry number selecting processing 312.

The second associative memory address information judging processing 305 is for judging whether the address retained in the address retaining processing 303 and the address retained in the address information 113 match, in the address comparator unit 107. If they match, the data to be fetched in the buffering processing at this time correspond to the unprocessed data transfer request. Thus, the process goes on to the cycle judging processing 306. If they do not match, the data to be fetched in the buffering processing at this time do not correspond to the unprocessed data transfer request. Thus, for the purpose of storing the fetched data into the associative memory 106, the process goes on to the entry number selecting processing 312.

The cycle judging processing 306 is for judging which cycle is being executed on the system bus 132, in the address/data control unit 104. If it is a read cycle, the process goes on to the target judging processing 308, while if not, the process goes on to the second associative memory data information transfer processing 307. In other words, when it is a read cycle, the process goes on to the judging processing of judging from which resource on the system bus this information is read out, while when it is not a read cycle but a write cycle, the process goes on to the fetching processing of fetching the information currently being driven on the data line.

The second associative memory data information transfer processing 307 is for writing an address into the address information 113, in the second associative memory 108, and followed by the second associative memory data information turning-effective processing 311.

The target judging processing 308 is for judging whether the bus target is the main memory 135 or the I/O device 136 based on the chip select signal lines 126 and 127, in the protocol checker 125. If it is the main memory 135, the process goes on to the second associative memory OE synchronous data information transfer processing 309, while if it is the I/O device 136, the process goes on to the second associative memory DACK synchronous data information transfer processing 310.

The second associative memory OE synchronous data information transfer processing 309 is for writing the value of the data line driven by the address/data control unit 104 into the data information 114 of the second associative memory 108, when the output enable signal line 128 is asserted, in the associative memory control unit 105 and the protocol checker protocol checker 125. This processing is followed by the second associative memory data information turning-effective processing 311.

The second associative memory DACK synchronous data information transfer processing 310 is for writing the value driven on the data signal line on the system bus 132 into the data information 114 of the second associative memory 108 through the address/data control unit 104, when the data acknowledge signal line 129 is asserted, in the associative memory control unit 105 and the protocol checker 125. This processing is followed by the second associative memory data information turning-effective processing 311.

The second associative memory data information turning-effective processing 311 is for turning ON the data effective bit 116 of the second associative memory 108, in the associative memory control unit 105, and subsequently the data buffering processing 202 ends.

The entry number selecting processing 312 is for selecting an entry from address values retained in the address retaining processing 204, in the associative memory control unit 105. In this case, more specifically, it is the processing for selecting 0 if the values of low—order 4 bits of the address expressed in hexadecimal notation are 0 or 8, otherwise selecting 1, so as to drive the selected value on the write entry select signal line 117. After this processing, the process goes on to the address information transfer processing 313.

The address information transfer processing 313 is for driving the address retained in the address retaining processing 303 on the write address information signal line 119, in the associative memory control unit 105, followed by the cycle judging processing 314.

The cycle judging processing 314 is for judging which cycle is being executed on the system bus 132, in the address/data control unit 104. If it is a read cycle, the process goes on to the target judging processing 316, while if not, the process goes on to the data information transfer processing 315. In other words, if it is a read cycle, the process goes on to the judging processing of judging from which resource on the system bus the information is read out, while if it is not a read cycle but a write cycle, the process goes on to the fetching processing of fetching the information currently driven on the data line.

The data information transfer processing 315 is for driving the data on the write data information signal line 120, asserting the write enable signal line 118 and writing the address information and the data information into the associative memory 106, in the associative memory control unit 105, and subsequently the data buffering processing 202 ends.

The target judging processing 316 is for judging whether the bus target is the main memory 135 or the I/O device 136 by the chip select signal lines 126 and 127, in the protocol checker 125. If it is the main memory 135, the process goes on to the OE synchronous data information transfer processing 317, while if it is the I/O device 136, the process goes on to the DACK synchronous data information transfer processing 318.

The OE synchronous data information transfer processing 317 is for driving the value of the data line driven by the address/data control unit 104 on the write data information signal line 120 and turning the write enable signal line 118 ON, when the output enable signal line 128 is asserted, in the associative memory control unit 105 and the protocol checker 125. After this processing, the data buffering processing 202 ends.

The DACK synchronous data information transfer processing 318 is for driving the value of the data signal line driven from the address/data control unit 104 and turning the write enable signal line 118 ON, when the data acknowledge signal line 129 is asserted, in the associative memory control unit 105 and the protocol checker 125. After this processing, the data buffering processing 202 ends.

The above description is directed to the specific operation of the data buffering processing 202 in FIG. 2.

Figure 4:
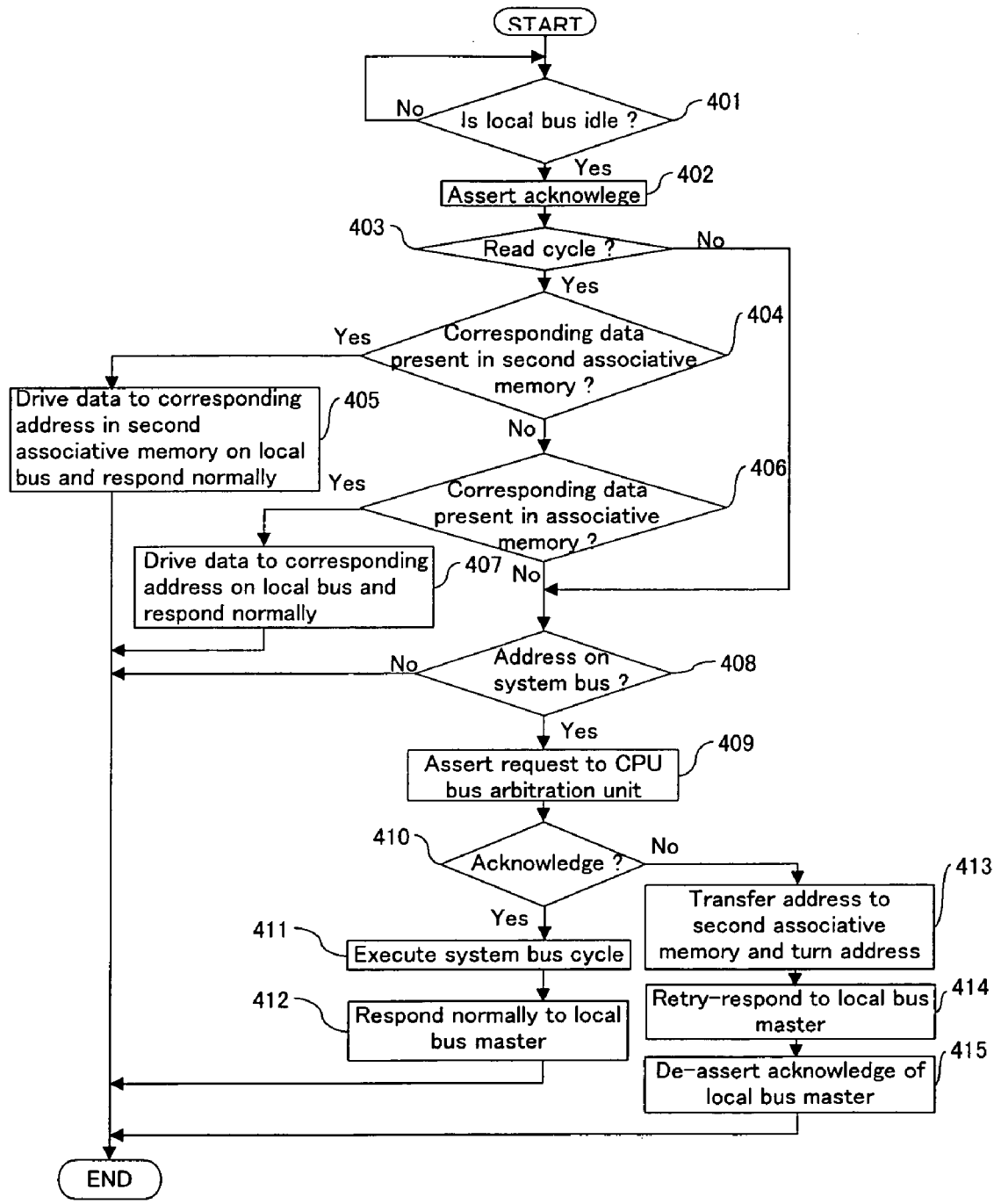
FIG. 4 is a flowchart showing a specific operation of a buffered data transfer processing.

Next, the buffered data transfer processing 204 in FIG. 2 will be described more specifically. FIG. 4 is a flowchart showing a specific operation of the buffered data transfer processing 204.

In FIG. 4, numeral 401 indicates a local bus idle judging processing, numeral 402 indicates an acknowledge asserting processing, numeral 403 indicates a cycle judging processing, numeral 404 indicates a second associative memory data judging processing, numeral 405 indicates a second associative memory data transfer processing, numeral 406 indicates a buffered data judging processing, numeral 407 indicates a buffered data transfer processing, numeral 408 indicates an address judging processing, numeral 409 indicates a system bus request processing, numeral 410 indicates a system bus acknowledge judging processing, numeral 411 indicates a system bus master processing, numeral 412 indicates a local bus target processing, numeral 413 indicates a second associative memory address information turning-effective processing, numeral 414 indicates a local bus retry response processing, and numeral 415 indicates an acknowledge de-asserting processing.

The local bus idle judging processing 401 is for judging whether or not the local bus 137 is in an idle status or currently returning acknowledgement to a local bus master receiving a request, in the bus arbitration unit 103. If the local bus 137 is in an idle status or currently returning acknowledgement to a local bus master receiving a request, the process goes on to the acknowledge asserting processing 402, while if not, it stays in the local bus idle judging processing 401.

The acknowledge asserting processing 402 is for asserting the acknowledge signal line 140, in the bus arbitration unit 103, and followed by the cycle judging processing 403.

The cycle judging processing 403 is for monitoring a cycle generation on the local bus 137 and judging whether or not the generated cycle is a read cycle, in the bridge control unit 102. If it is a read cycle, the process goes on to the second associative memory data judging processing 404, while if not, the process goes on to the address judging processing 408. In other words, if the local bus is in a read cycle, the process goes on to the processing of transferring data to the local bus, while if it is not a read cycle, it is a request to write information into a resource on the system bus 132. Thus, the process goes on to the processing of asserting a request for a bus arbitration to the bus arbitration unit 134.

The second associative memory data judging processing 404 is for checking whether or not the data being transferred at this time is the entry data in response to the remained unprocessed data transfer request at the moment, in the associative memory control unit 105. When the data effective bit 116 is ON, the value of the address information 113 is transferred to the address comparator unit 107 so as to judge whether or not this matches an address currently being driven on the local bus 137 in the address comparator unit 107. If they match, the process goes on to the second associative memory data transfer processing 405. If not, for the purpose of checking whether or not the data to be transferred at this time is present in the associative memory 106, the process goes on to the buffered data judging processing 406. In addition, when the data effective bit 116 is OFF, there are no remained unprocessed data transfer requests at the moment, so the process goes on to the buffered data judging processing 406.

The second associative memory data transfer processing 405 is for reading out data from the data information 114 in the associative memory control unit 105, and driving such data on the local bus 137 in the address/data control unit 104 so as to respond to a cycle on the local bus. After this processing, the buffered data transfer processing 204 ends.

When the effective bit 112 with the entry number corresponding to an address being driven on the local bus 137 is ON, the buffered data judging processing 406 is for transferring the address from the address information 110 to the address comparator unit 107 in the associative memory control unit 105 and judging whether or not this matches the address being driven on the local bus 137 in the address comparator unit 107. If they match, the process goes on to the buffered data transfer processing 407, while if not, the process goes on to the address judging processing 408. In other words, since it is not possible to respond to the data transfer request by the data buffered in the associative memory 106 in this case, the process goes on to the processing of checking whether or not it is necessary actually to access a resource on the system bus 132. When the effective bit 112 with the entry number corresponding to the address being driven on the local bus 137 is OFF, the process goes on to the address judging processing 408.

The buffered data transfer processing 407 is for reading out data from the data information 111 of the entry in the associative memory 106 having the address information 110 that has been matched with the address driven on the local bus 137 in the buffered data judging processing 406, in the associative memory control unit 105, and driving such data on the local bus 137 in the address/data control unit 104 so as to respond to a cycle on the local bus. After this processing, the buffered data transfer processing 204 ends.

The address judging processing 408 decodes the address driven on the local bus 137 in the address/data control unit 104. When this address is located in a memory space allocated to a device on the system bus 132, the process goes on to the system bus request processing 409, and otherwise ends the buffered data transfer processing 204.

The system bus request processing 409 is for asserting the request signal line 130, in the bus arbitration unit 103, followed by the system bus acknowledge judging processing 410.

The system bus acknowledge judging processing 410 is for judging whether or not the acknowledge signal line 131 is asserted, in the bus arbitration unit 103. If the acknowledge signal line 131 is asserted, the process goes on to the system bus master processing 411, and otherwise goes on to the second associative memory address information turning-effective processing 413.

The system bus master processing 411 is for generating a cycle on the system bus 132 and presenting the data transfer request received from the local bus 137 on the system bus, in the address/data control unit 104, and followed by the local bus target processing 412.

The local bus target processing 412 is for driving the result of the data transfer request presented in the system bus master processing 411 on the local bus 137, in the address/data control unit 104, and subsequently the buffered data transfer processing 204 ends.

The second associative memory address information turning-effective processing 413 is for transferring the address driven on the local bus 137 to the address information 113 and turning the address effective bit 115 ON, in the associative memory control unit 105, and followed by the local bus retry response processing 414.

The local bus retry response processing 414 is for retry-responding to the local bus 137, in the address/data control unit 104, and followed by the acknowledge de-asserting processing 415.

The acknowledge de-asserting processing 415 is for de-asserting the acknowledge signal line 140, in the bus arbitration unit 103, and subsequently the buffered data transfer processing 204 ends.

The above description is directed to the operation of the buffered data transfer processing 204 shown in FIG. 2.

Next, the operation of the data transfer apparatus of the first embodiment will be explained referring to an actual data transfer as an example.

Figure 5:
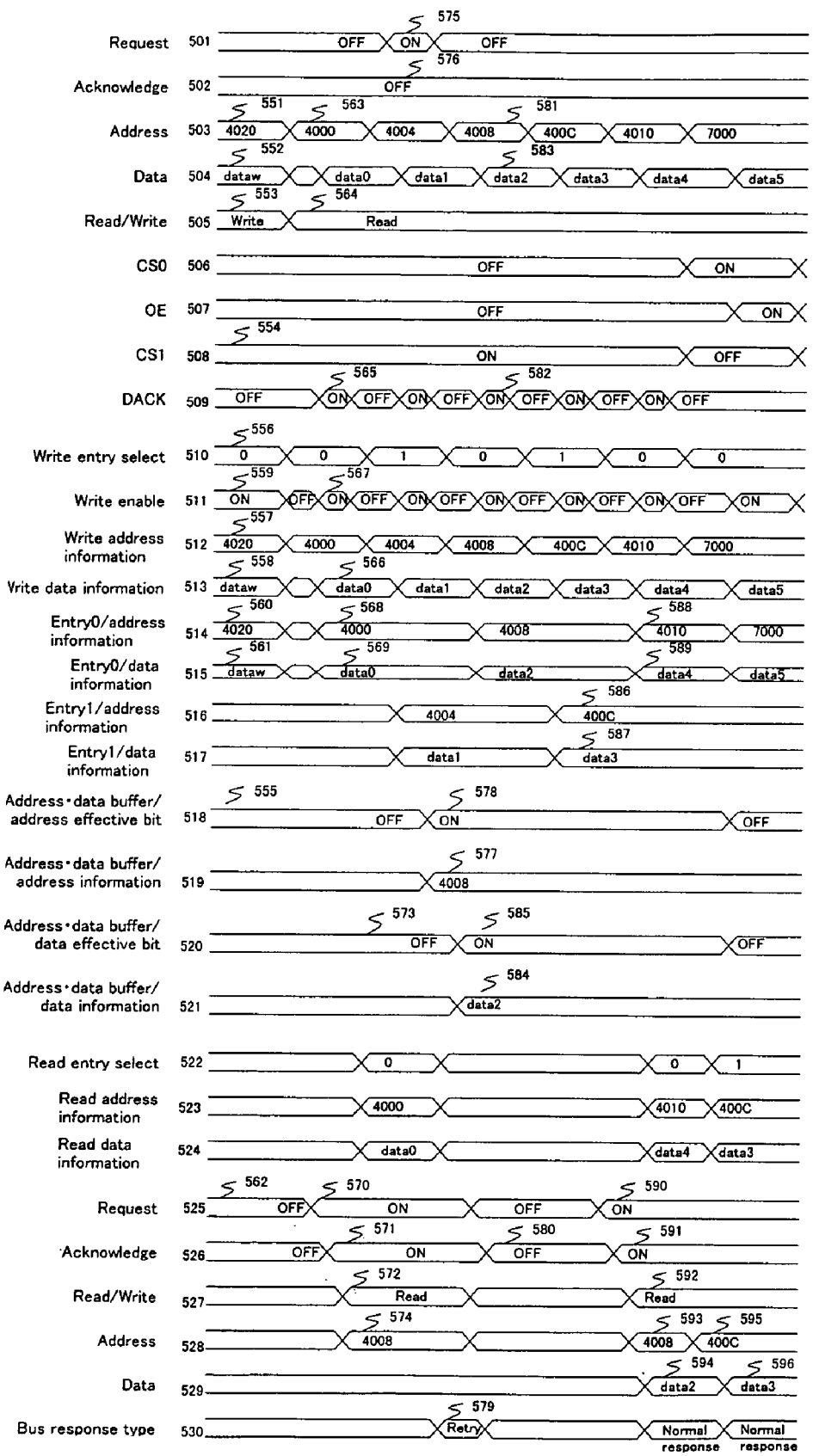
FIG. 5 is a timing chart showing one example of an operation using data of the first embodiment.

FIG. 5 is a timing chart showing one example of an operation using data of the first embodiment.

In FIG. 5, numeral 501 indicates the status of the request signal line 130, numeral 502 indicates that of the acknowledge signal line 131, numeral 503 indicates that of an address line on the system bus 132, numeral 504 indicates that of a data line on the system bus 132, and numeral 505 indicates that of a read/write signal line on the system bus 132. Numeral 506 indicates the status of the chip select signal line 126, numeral 507 indicates that of the output enable signal line 128, numeral 508 indicates that of the chip select signal line 127, and numeral 509 indicates that of the data acknowledge signal line 129. Numeral 510 indicates the status of the write entry select signal line 117, numeral 511 indicates that of the write enable signal line 118, numeral 512 indicates that of the write address information signal line 119, and numeral 513 indicates that of the write data information signal line 120. Numeral 514 indicates the status of the address information 110 of an entry 0 in the associative memory 106, numeral 515 indicates that of the data information 111 of the entry 0 in the associative memory 106, numeral 516 indicates that of the address information 110 of an entry 1 in the associative memory 106, and numeral 517 indicates that of the data information 111 of the entry 1 in the associative memory 106. Numeral 518 indicates the status of the address effective bit 115, numeral 519 indicates that of the address information 113, numeral 520 indicates that of the data effective bit 116, and numeral 521 indicates that of the data information 114. Numeral 522 indicates the status of the read entry select signal line 121, numeral 523 indicates that of the read address information signal line 122, and numeral 524 indicates that of the read data information signal line 123. Numeral 525 indicates the status of the request signal line 139, numeral 526 indicates that of the acknowledge signal line 140, numeral 527 indicates that of the read/write signal line on the local bus 137, numeral 528 indicates that of the address line on the local bus 137, numeral 529 indicates that of the data line on the local bus 137, and numeral 530 indicates a response status of the bus bridge 101 on the local bus 137.

First, in the system bus cycle generation judging processing 201, since a cycle for writing data "dataw" into an address "4020" is generated as indicated by numerals 551 to 553, the process goes on to the data buffering processing 202.

Next, in the data buffering processing 202, the bus bridge target judging processing 301 is executed first, to find that the chip select signal line 127 is asserted as indicated by numeral 554 and the bus bridge 101 is not a target for this cycle. Therefore, the process goes on to the address retaining processing 303.

Subsequently, in the address retaining processing 303, the address "4020" is retained in the address/data control unit 104, so as to proceed to the address effective bit judging processing 304.

Then, in the address effective bit judging processing 304, since the address effective bit 115 is OFF as indicated by numeral 555, the process goes on to the entry number selecting processing 312.

In the entry number selecting processing 312, the entry number 0 is selected from the address "4020", and 0 is driven on the write entry select signal line 117 as indicated by numeral 556, so as to proceed to the address information transfer processing 313.

In the address information transfer processing 313, the address "4020" is driven on the write address information signal line 119 as indicated by numeral 557, so as to proceed to the cycle judging processing 314.

Next, in the cycle judging processing 314, since this cycle is a write cycle as indicated by numeral 553, the process goes on to the data information transfer processing 315.

Then, in the data information transfer processing 315, the data "dataw" is driven on the write data information signal line 120 as indicated by numeral 558, the write enable signal line 118 is asserted as indicated by numeral 559, and the address "4020" and the data "dataw" are written into the address information 110 and the data information 111 of the entry 0 in the associative memory 106 respectively as indicated by numerals 560 and 561, so as to end the data buffering processing 202.

Next, in the local bus request generation detecting processing 203, since the request signal line 139 is not asserted as indicated by numeral 562, the process returns to the system bus cycle generation detecting processing 201.

In the system bus cycle generation detecting processing 201, since a cycle for reading out data at an address "4000" is generated as indicated by numerals 563 and 564, the process goes on to the data buffering processing 202.

In the data buffering processing 202, the same processing as in the above-described case of the write cycle of writing the data "dataw" into the address "4020" is carried out from the bus bridge target judging processing 301 to the address information transfer processing 313 except that the address values are different.

Next, in the cycle judging processing 314, since this cycle is a read cycle as indicated by numeral 564, the process goes on to the target judging processing 316.

In the target judging processing 316, the chip select signal line 127 is asserted as indicated by numeral 554, thereby judging that the I/O device 136 is the bus target, so as to proceed to the DACK synchronous data information transfer processing 318.

In the DACK synchronous data information transfer processing 318, when the data acknowledge signal line 129 is asserted as indicated by numeral 565, data "data0" is driven on the write data information signal line 120 as indicated by numeral 566, and the write enable signal line 118 is turned ON as indicated by numeral 567. Then, the address "4000" and the data "data0" are written into the address information 110 and the data information 111 of the entry 0 in the associative memory 106 respectively as indicated by numerals 568 and 569, so as to end the data buffering processing 202 and proceed to the local bus request generation detecting processing 203.

Next, in the local bus request generation detecting processing 203, since the request signal line 139 is asserted as indicated by numeral 570, the process goes on to the buffered data transfer processing 204.

In the buffered data transfer processing 204, the local bus idle judging processing 401 is executed first, to find that the local bus 137 is in the idle status. Therefore, the process goes on to the acknowledge asserting processing 402.

In the acknowledge asserting processing 402, the acknowledge signal line 140 is asserted as indicated by numeral 571, so as to proceed to the cycle judging processing 403.

In the cycle judging processing 403, since the cycle generated on the local bus 137 is a read cycle as indicated by numeral 572, the process goes on to the second associative memory data judging processing 404.

Then, in the second associative memory data judging processing 404, since the data effective bit 116 is OFF as indicated by numeral 573, the process goes on to the buffered data judging processing 406.

In the buffered data judging processing 406, since the address in the address information 110 with the entry number 0 corresponding to the address "4008" that is driven on the local bus 137 as indicated by numeral 574 is "4000" as indicated by numeral 568 and does not match with "4008", the process goes on to the address judging processing 408.

In the address judging processing 408, the address "4008" driven on the local bus 137 is decoded. Since this address is in the memory space allocated to the device on the system bus 132, the process goes on to the system bus request processing 409.

In the system bus request processing 409, the request signal line 130 is asserted as indicated by numeral 575, so as to proceed to the system bus acknowledge judging processing 410.

In the system bus acknowledge judging processing 410, since the acknowledge signal line 131 is not asserted as indicated by numeral 576, the process goes on to the second associative memory address information turning-effective processing 413.

In the second associative memory address information turning-effective processing 413, the address "4008" driven on the local bus 137 is transferred to the address information 113 and the address effective bit 115 is turned ON as indicated by numerals 577 and 578, so as to proceed to the local bus retry response processing 414.

Then, in the local bus retry response processing 414, the retry-response is carried out to the local bus 137 as indicated by numeral 579, so as to proceed to the acknowledge de-asserting processing 415.

In the acknowledge de-asserting processing 415, the acknowledge signal line 140 is de-asserted so as to end the buffered data transfer processing 204 as indicated by numeral 580, and then returns to the system bus cycle generation detecting processing 201.

Next, in the system bus cycle generation detecting processing 201, since the read cycle of the address "4008" is generated on the system bus 132 as indicated by numerals 564 and 581, the process goes on to the data buffering processing 202.

In the data buffering processing 202, the bus bridge target judging processing 301 is executed first, to find that the chip select signal line 127 is asserted as indicated by numeral 554 and the bus bridge 101 is not a target for this cycle. Therefore, the process goes on to the address retaining processing 303.

Subsequently, in the address retaining processing 303, the address "4008" is retained in the address/data control unit 104, so as to proceed to the address effective bit judging processing 304.

Then, in the address effective bit judging processing 304, since the address effective bit 115 is ON as indicated by numeral 578, the process goes on to the second associative memory address information judging processing 305.

In the second associative memory address information judging processing 305, since the address "4008" retained in the address retaining processing 204 and the address "4008" retained in the address information 113 as indicated by numeral 577 match, the process goes on to the cycle judging processing 306.

Next, in the cycle judging processing 306, since this cycle is a read cycle as indicated by numeral 564, the process goes on to the target judging processing 308.

In the target judging processing 308, the chip select signal line 127 is asserted as indicated by numeral 554, thereby judging that the bus target is the I/O device 136, so that the process goes on to proceed to the second associative memory DACK synchronous data information transfer processing 310.

In the second associative memory DACK synchronous data information transfer processing 310, when the data acknowledge signal line 129 is asserted as indicated by numeral 582, the value data "data2" of the data signal line indicated by numeral 583 is written into the data information 114 as indicated by numeral 584, then the process goes on to the second associative memory data information turning-effective processing 311.

In the second associative memory data information turning-effective processing 311, the data effective bit 116 in the second associative memory 108 is turned ON as indicated by numeral 585, so as to end the data buffering processing 202, and then the process goes on to the local bus request generation detecting processing 203.

Subsequently, an address "400C" and data "data3" are written into an entry 1 as indicated by numerals 586 and 587, and an address "4010" and data "data4" are written into an entry 0 as indicated by numerals 588 and 589. Thereafter, the assertion of the request signal line 139 indicated by numeral 590 is detected in the local bus request generation detecting processing 203, then the process goes on to the buffered data transfer processing 204.

In the buffered data transfer processing 204, the local bus idle judging processing 401 is executed first, to find that the local bus 137 is in the idle status. Therefore, the process goes on to the acknowledge asserting processing 402.

In the acknowledge asserting processing 402, the acknowledge signal line 140 is asserted as indicated by numeral 591, so that the process goes on to the cycle judging processing 403.

In the cycle judging processing 403, since the cycle generated on the local bus 137 is a read cycle as indicated by numeral 592, the process goes on to the second associative memory data judging processing 404.

Then, in the second associative memory data judging processing 404, since the data effective bit 116 is ON as indicated by numeral 585, the value "4008" of the address information 113 indicated by numeral 577 and the address "4008" driven on the local bus 137 indicated by numeral 593 match, and thus the process goes on to the second associative memory data transfer processing 405.

In the second associative memory data transfer processing 405, the data "data2" indicated by numeral 584 is read out from the data information 114 and driven on the data signal line on the local bus 137 as indicated by numeral 594, and then the process of the buffered data transfer processing 204 ends.

Subsequently, when the read cycle to the address "400C" is generated on the local bus 137 as indicated by numeral 595, it is judged if the address "400C" of the address information 110 with the entry number 1 indicated by numeral 586 and the address "400C" driven on the local bus 137 match in the buffered data judging processing 406, then the process goes on to the buffered data transfer processing 407.

Then, in the buffered data transfer processing 407, the data "data3" indicated by numeral 587 is read out from the data information 111 with the entry 1 and driven on the data signal line on the local bus 137 as indicated by numeral 596.

In the above description, there are two entries in the associative memory 106. However, there may be one entry or more than two entries. As the number of the entries increases, the effect becomes larger but the circuit of the bridge also becomes larger.

Second Embodiment

Figure 6:
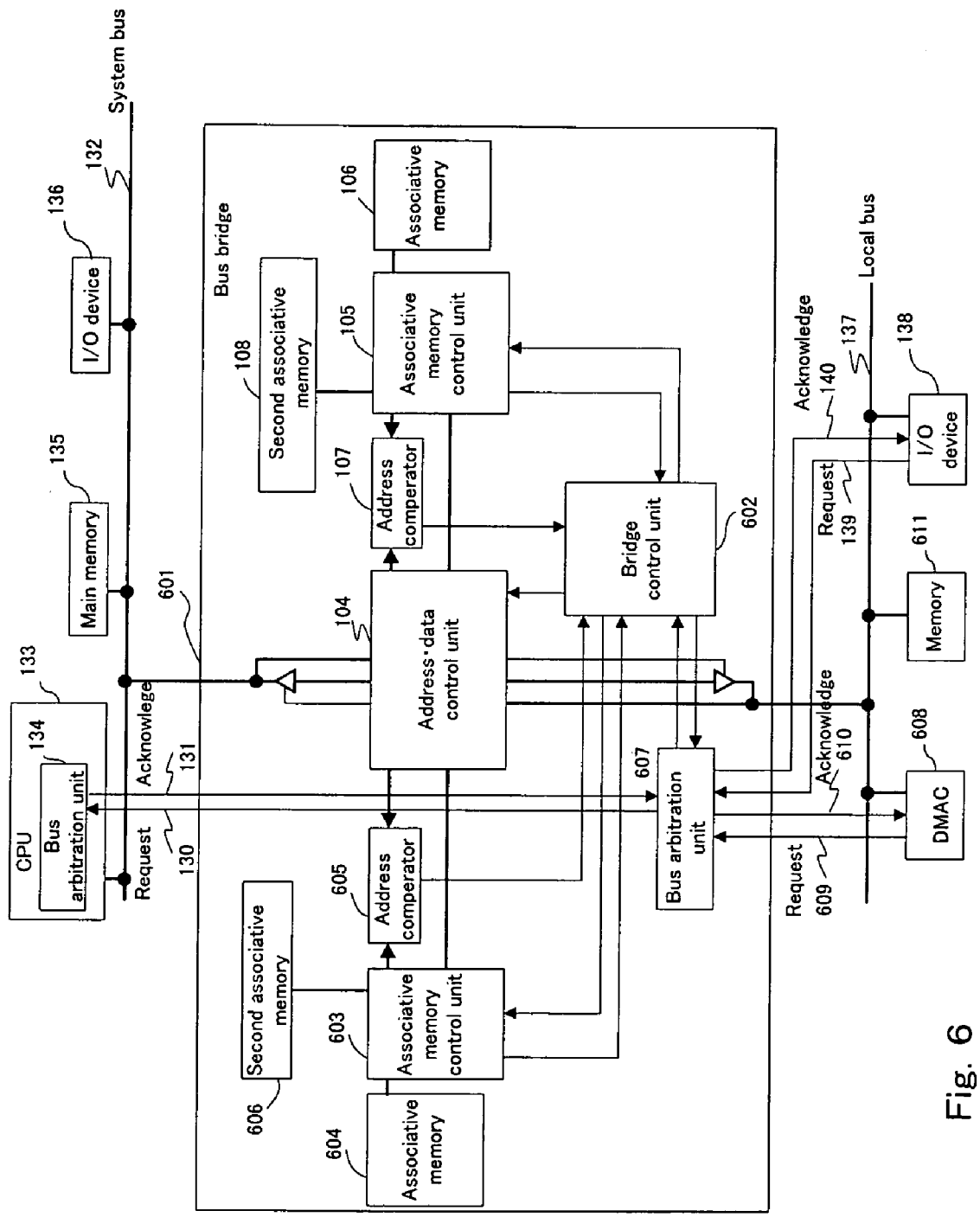
FIG. 6 is a conceptual view of a bus bridge having a buffer for a local bus according to a second embodiment.
Figure 7:
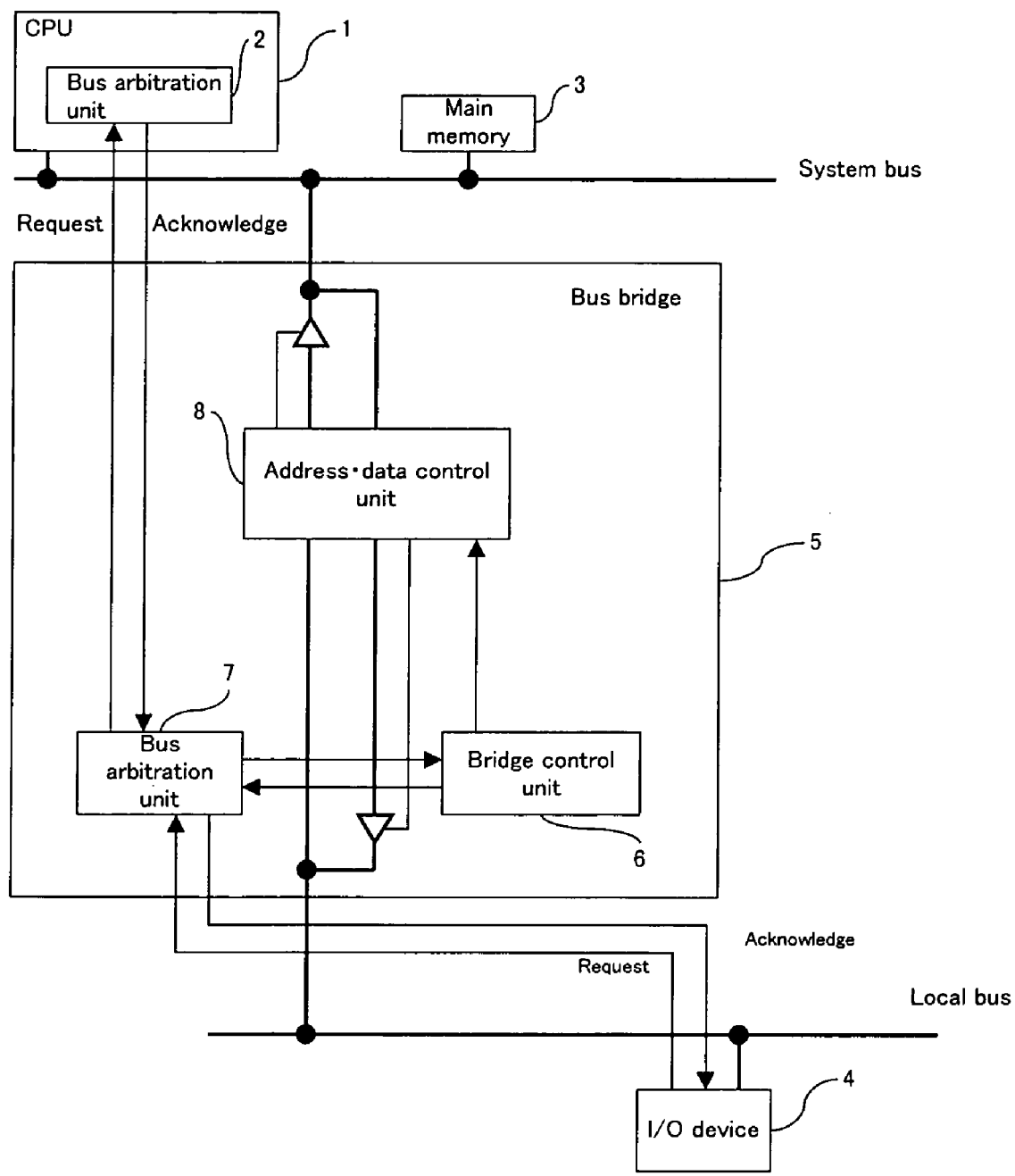
FIG. 7 is a conceptual view of a conventional data transfer apparatus.
Figure 8:
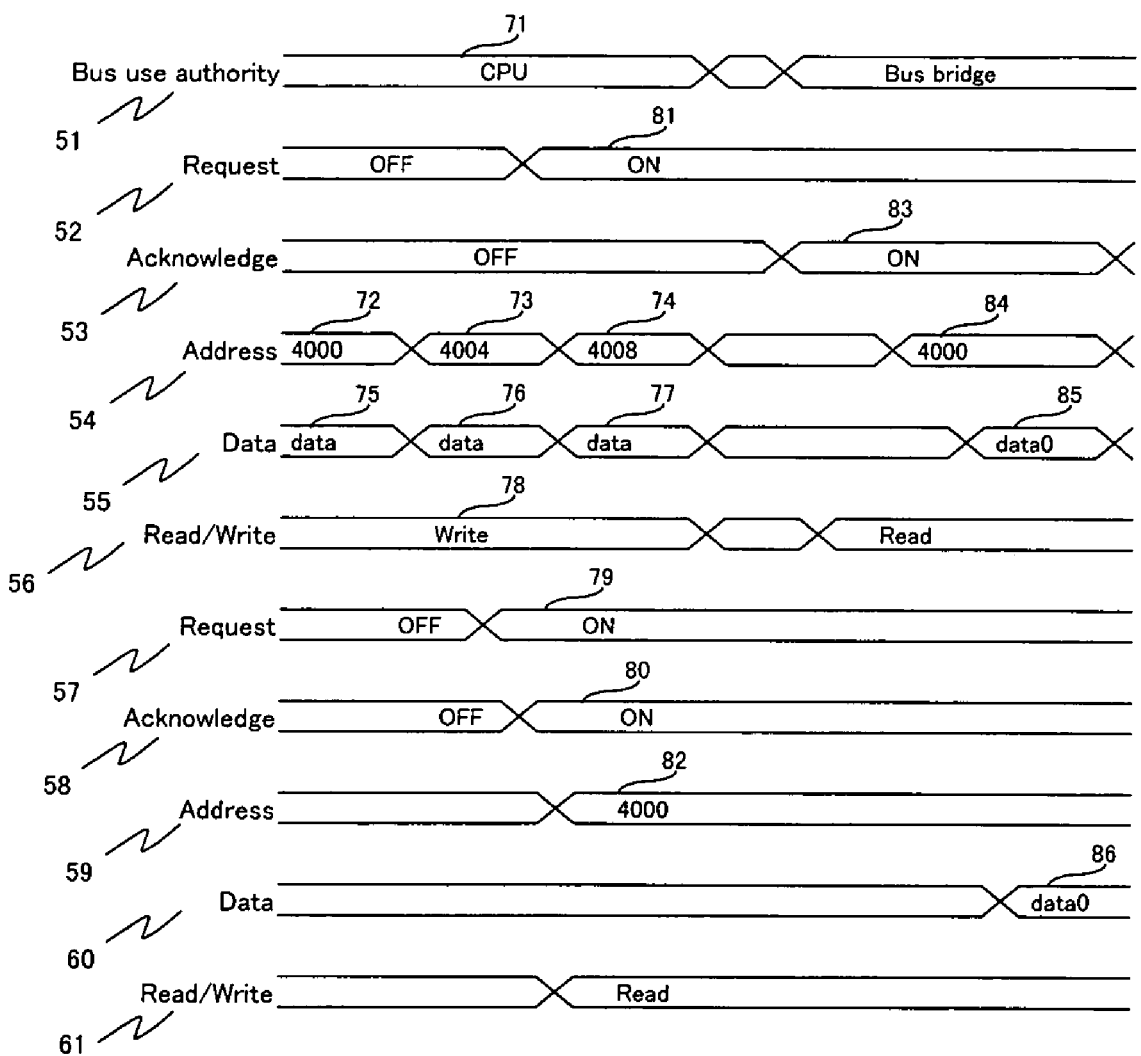
FIG. 8 is a timing chart of an operation of the conventional data transfer apparatus.

In the data transfer apparatus and the data transfer method in the first embodiment, besides the bus bridge 101, there is no device other than the I/O device 138 on the local bus 137. However, in the case where there are other devices and data are transferred between these devices, such data can be retained in another buffer in the bus bridge. In this way, when an access to this data is required from the system bus 132, it is possible to transfer the data from the buffer without accessing the local bus 137. In addition, by providing another buffer, it is possible to prevent the data that are transferred between the devices and retained on the local bus 137 from being overwritten by the data transferred between the devices and retained on the system bus 132. FIG. 6 is a conceptual view of a bus bridge including an associative memory 604 for such local bus. FIG. 1 shows the configuration provided with only the associative memory 106 for the system bus, while FIG. 6 shows the configuration according to the second embodiment, provided with not only the associative memory 106 for the system bus but also the associative memory 604 for the local bus.

In FIG. 6, numeral 601 denotes a bus bridge, numeral 602 denotes a bridge control unit, numeral 603 denotes an associative memory control unit, numeral 604 denotes an associative memory, numeral 605 denotes an address comparator unit, numeral 606 denotes a second associative memory, numeral 607 denotes a bus arbitration unit, numeral 608 denotes a DMA controller, numeral 609 denotes a request signal line, numeral 610 denotes an acknowledge signal line, and numeral 611 denotes a memory.

The bus bridge 601 retains addresses and data transferred on the system bus 132 in the associative memory 106 and those transferred on the local bus 137 in the associative memory 604. When a data transfer request from the address on the local bus 137 is generated at a cycle on the system bus 132 and this data is retained in the associative memory 604, the bus bridge 601 transfers the data retained in the associative memory 604 to the system bus 132 without generating any cycle on the local bus.

The bridge control unit 602 controls an entire operation of the bus bridge 601.

The associative memory control unit 603 is connected to the associative memory 604 and the second associative memory 606, and transfers addresses and data to be transferred between the I/O device 138, the DMA controller 608 and the memory 611 to the associative memory 604 or the second associative memory 606. When a read cycle from the CPU 133 to the memory 611 is generated, if the driven address is retained in the associative memory 604 or the second associative memory 606, the associative memory control unit 603 reads out the data from the associative memory 604 or the second associative memory 606 and transfers this data to the address/data control unit 104.

The second associative memory 606 is the same as the second associative memory 108 described in the first embodiment. The second associative memory 606 is connected to the associative memory control unit 603. When data corresponding to a data transfer request from the local bus are not contained in the associative memory 604, the associative memory control unit 603 writes the address of this data transfer request into the second associative memory 606.

The bus bridge 601 has the associative memory 604 in addition to the associative memory 106. Therefore, by retaining the data to be written into the memory 611 from the DMA controller 608 in the associative memory 604, for example, when an access to this data from the CPU 133 is generated, it is possible to transfer the data from the associative memory 604 without accessing the memory 611. Furthermore, it also is possible to prevent this data from being overwritten by the data transferred between the devices and retained on the system bus 132.

A specific process operation of the data transfer processing regarding the associative memory 604 for the local bus can be considered the same as that of the data transfer processing regarding the associative memory 106 for the system bus described in the first embodiment.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A data transfer apparatus comprising:
   an associative memory; and
   a controller connected between a system bus and a local bus for controlling data input/output of the associative memory;
   wherein the controller of the data transfer apparatus, the data transfer apparatus being a first device, fetches an address and data that are transferred between a second device and a third device that are connected only on the system bus so as to duplicate and store them in the associative memory, and
   when a fourth device on the local bus generates a read cycle to read data from a read address associated with one of the second and third devices on the system bus and the read address is contained in the address stored in the associative memory, the controller reads out corresponding data from the associative memory so as to transfer it to the local bus.

2. The data transfer apparatus according to claim 1, wherein, if it is detected that a write cycle of writing a data from one of the second or third devices to another of the second or third devices is generated on the system bus, the controller fetches the address and the data that are transferred between the second and third devices so as to duplicate and store them in the associative memory.

3. The data transfer apparatus according to claim 1, wherein the controller monitors a data output enable signal line of at least one device controller on the system bus and, when the data output enable signal line is asserted, fetches the address and the data that are transferred on the system bus so as to duplicate and store them in the associative memory.

4. The data transfer apparatus according to claim 1, wherein the controller monitors a data output strobe signal line of at least one device controller on the system bus and, when the data output strobe signal line is asserted, fetches the address and the data that are transferred on the system bus so as to duplicate and store them in the associative memory.

5. The data transfer apparatus according to claim 1, wherein, when the address from which the data is transferred indicated by the data transfer request accepted from the local bus is not contained in the address stored in the associative memory, the controller stores a data effective information indicating the address in which a transfer operation has not been completed in response to the data transfer request in a second associative memory, fetches the address and the data that are transferred between the devices on the system bus and, if the fetched address is the address indicated by the data effective information, transfers it to the local bus as data corresponding to the data transfer request.

* * * * *